(12) United States Patent
Hanan et al.

(10) Patent No.: US 12,104,036 B2
(45) Date of Patent: Oct. 1, 2024

(54) GRAPHENE POLYETHYLENE TEREPHTHALATE COMPOSITE FOR IMPROVING REHEAT ENERGY CONSUMPTION

(71) Applicant: NIAGARA BOTTLING, LLC, Diamond Bar, CA (US)

(72) Inventors: Jay Clarke Hanan, Glendora, CA (US); Sudheer Bandla, Rancho Cucamonga, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 0 days.

(21) Appl. No.: 17/936,238

(22) Filed: Sep. 28, 2022

(65) Prior Publication Data

US 2023/0013120 A1    Jan. 19, 2023

Related U.S. Application Data

(62) Division of application No. 16/837,626, filed on Apr. 1, 2020, now Pat. No. 11,472,940.

(60) Provisional application No. 62/827,439, filed on Apr. 1, 2019.

(51) Int. Cl.
| | |
|---|---|
| C08J 3/20 | (2006.01) |
| B29B 7/90 | (2006.01) |
| B29B 11/08 | (2006.01) |
| C08G 63/127 | (2006.01) |
| C08J 5/24 | (2006.01) |
| C08K 3/04 | (2006.01) |
| B29K 67/00 | (2006.01) |
| B29K 105/16 | (2006.01) |
| B29K 507/04 | (2006.01) |

(52) U.S. Cl.
CPC .............. *C08K 3/042* (2017.05); *B29B 7/90* (2013.01); *B29B 11/08* (2013.01); *C08G 63/127* (2013.01); *C08J 3/20* (2013.01); *C08J 3/203* (2013.01); *C08J 5/24* (2013.01); *B29K 2067/003* (2013.01); *B29K 2105/162* (2013.01); *B29K 2507/04* (2013.01); *C08J 2367/02* (2013.01); *C08K 2201/003* (2013.01); *C08K 2201/006* (2013.01); *C08K 2201/011* (2013.01)

(58) Field of Classification Search
CPC .............. C08K 3/042; C08K 2201/003; C08K 2201/006; C08K 2201/011; B29B 7/90; B29B 11/08; B29B 7/16; B29B 7/286; B29B 7/86; B29B 7/005; C08G 63/183; C08G 63/127; C08J 3/20; C08J 3/203; C08J 5/14; C08J 2367/02; B29K 2067/003; B29K 2106/162; B29K 2507/04; B29K 2105/12

USPC .............................................. 524/496
See application file for complete search history.

(56) References Cited

U.S. PATENT DOCUMENTS

| | | |
|---|---|---|
| 3,487,049 A | 12/1969 | Busot |
| 3,675,180 A | 4/1972 | Cohn |
| 3,709,859 A | 1/1973 | Hrach et al. |
| 3,907,754 A | 9/1975 | Tershansy et al. |
| 3,951,905 A | 4/1976 | Sano et al. |
| 3,962,189 A | 6/1976 | Russin et al. |
| 4,010,145 A | 3/1977 | Russin et al. |
| 4,107,149 A | 8/1978 | Bier et al. |
| 4,244,910 A | 1/1981 | Yui et al. |
| 4,501,878 A | 2/1985 | Adams |
| 5,019,640 A | 5/1991 | Engel-Badar et al. |
| 6,063,465 A | 5/2000 | Charbonneau et al. |
| 6,713,600 B1 | 3/2004 | Isayev et al. |
| 7,608,652 B2 | 10/2009 | Bashir et al. |
| 8,859,668 B2 | 10/2014 | Morishita et al. |
| 9,080,122 B2 | 7/2015 | Kwon et al. |

(Continued)

FOREIGN PATENT DOCUMENTS

| | | |
|---|---|---|
| CA | 2992816 A1 | 1/2017 |
| CN | 103242630 A | 8/2013 |

(Continued)

OTHER PUBLICATIONS

Korean Patent Office Action for Related Application No. 10-2018-7003463 dated Nov. 28, 2022 (15 pages, including an English translation).

(Continued)

*Primary Examiner* — Hannah J Pak
(74) *Attorney, Agent, or Firm* — Michael Best & Friedrich LLP

(57) ABSTRACT

A graphene reinforced polyethylene terephthalate composition is provided for forming graphene-PET containers. The graphene reinforced polyethylene terephthalate composition includes a continuous matrix comprising polyethylene terephthalate and a dispersed reinforcement phase comprising graphene nanoplatelets. The graphene nanoplatelets range in diameter between 5 μm and 10 μm with surface areas ranging from about 15 m$^2$/g to about 150 m$^2$/g. In some embodiments, the graphene reinforced polyethylene terephthalate comprises a concentration of graphene nanoplatelets being substantially 3% weight fraction of the graphene reinforced polyethylene terephthalate. The graphene reinforced polyethylene terephthalate is configured to be injection molded into a graphene-PET preform suitable for forming a container. The graphene-PET preform is configured to be reheated above its glass transition temperature and blown into a mold so as to shape the graphene-PET preform into the container.

4 Claims, 7 Drawing Sheets

(56) References Cited

U.S. PATENT DOCUMENTS

| | | |
|---|---|---|
| 9,636,855 B2 | 5/2017 | Hanan |
| 9,890,263 B2 | 2/2018 | Hanan et al. |
| 9,957,360 B2 | 5/2018 | Hanan et al. |
| 10,087,302 B2 | 10/2018 | Hanan |
| 10,118,724 B2 | 11/2018 | Hanan et al. |
| 10,737,418 B2 | 8/2020 | Hanan et al. |
| 10,738,167 B2 | 8/2020 | Hanan et al. |
| 10,808,098 B2 | 10/2020 | Hanan |
| 11,472,938 B2 | 10/2022 | Hanan et al. |
| 11,472,940 B2 | 10/2022 | Hanan et al. |
| 2005/0065318 A1* | 3/2005 | Jernigan ............. B01J 19/26 528/480 |
| 2005/0255330 A1 | 11/2005 | Meyer |
| 2005/0267285 A1 | 12/2005 | Kulkarni et al. |
| 2006/0148959 A1 | 7/2006 | Isayev et al. |
| 2007/0216067 A1 | 9/2007 | Bahr et al. |
| 2009/0140213 A1 | 6/2009 | Sen et al. |
| 2009/0275689 A1 | 11/2009 | Isayev |
| 2010/0204072 A1 | 8/2010 | Kwon et al. |
| 2010/0233458 A1 | 9/2010 | Sun et al. |
| 2011/0014492 A1 | 1/2011 | Joshi |
| 2011/0017585 A1 | 1/2011 | Zhamu et al. |
| 2011/0204281 A1 | 8/2011 | Rouse |
| 2012/0098163 A1 | 4/2012 | Avila-Orta et al. |
| 2012/0121840 A1 | 5/2012 | Aksay et al. |
| 2012/0237749 A1 | 9/2012 | Aksay et al. |
| 2013/0015409 A1 | 1/2013 | Fugetsu |
| 2013/0302588 A1 | 11/2013 | Aksay et al. |
| 2014/0065402 A1 | 3/2014 | Suckeveriene et al. |
| 2014/0080962 A1 | 3/2014 | Hanan |
| 2014/0323002 A1 | 10/2014 | Qin et al. |
| 2016/0024283 A1* | 1/2016 | Shahverdi-Shahraki ............. C08K 9/04 524/394 |
| 2017/0009030 A1 | 1/2017 | Hanan et al. |
| 2017/0009046 A1 | 1/2017 | Hanan et al. |
| 2017/0081482 A1 | 3/2017 | Hanan et al. |
| 2017/0103826 A1 | 4/2017 | Al-Harthi et al. |
| 2017/0218166 A1 | 8/2017 | Hanan |
| 2018/0171099 A1 | 6/2018 | Hanan et al. |
| 2018/0215881 A1 | 8/2018 | Hanan |
| 2020/0308366 A1 | 10/2020 | Hanan |

FOREIGN PATENT DOCUMENTS

| | | |
|---|---|---|
| CN | 103710790 A | 4/2014 |
| EP | 3319935 A1 | 5/2018 |
| GB | 1417738 A | 12/1975 |
| GB | 1522656 A | 2/1985 |
| JP | 2002531614 A | 9/2002 |
| JP | 2004156055 A | 6/2004 |
| JP | 2008-184590 A | 8/2008 |
| JP | 2011016902 A | 1/2011 |
| KR | 2011012338 A | 11/2011 |
| PT | 107398 A | 7/2015 |
| WO | 2007145918 A2 | 12/2007 |
| WO | 2009134492 A2 | 11/2009 |
| WO | 2011008511 A1 | 1/2011 |
| WO | 2011028924 A2 | 3/2011 |
| WO | 2011102473 A | 8/2011 |
| WO | 2011102473 A1 | 8/2011 |
| WO | 2013004718 A1 | 1/2013 |
| WO | 2014144139 A1 | 9/2014 |

OTHER PUBLICATIONS

Mexican Patent Office Action for Application No. MX/a/2018/000003 dated Jul. 3, 2023 (6 pages, English translation included).

European Extended Search Report for Related Applciation No. 20782403.8 dated Nov. 21, 2022 (8 pages).

Ayoma et al., Melt crystallization of poly(ethylene terephthalate): Comparing addition of graphene vs. carbon nanotubes; Polymer 2014, vol. 55, No. 8, p. 2080.

Al-Jabareen, et al., "Improving the oxygen barrier properties of polyethylene terephthalate by graphite nanoplatelets", Journal of Applied Polymer Science, 2012, vol. 128, No. 3, pp. 1534-1539.

Drzal, L.T., Graphene Nanoplatelets: A Multi-funstional Nanomaterial Additive for Polymers and Composistes, Apr. 2013, http://egsciences.comwp-contant/uploads/2013/04/Drzal-Presentation.pdf.

Feng, et al., "In Situ Synthesis of Poly(Ethylene Terephthalate)/Graphene Composites Wsing a Catalyst Support on Graphite Oxide", 2011, pp. 3931-3939, vol. 21, Publisher: Journal of Materials Chemistry, UK.

Li, et al., "Poly(Ethylene Terephthlate)/Exfoliated Graphite Nanocomposites With Mproved Thermal Stability, Mechanical and Electrical Properties", 2011, pp. 560-566, Publisher: Composites: Part A 42, Published in: US.

Liu et al.,"Promoting the dispersion of graphene and crystallization of poly(lactic acid) with a freezing-dried graphene/PEG masterbatch", Composites Science and Technology, vol. 144, Mar. 20, 2017, pp. 215-222.

National Center for Biotechnology Information, "Dimethyl Terephthalate" PubChem Compound Database, 2005, http://pubchem.ncbi.gov/compound/dimethyl_terephthlate#/section=Top> pp. 1-8.

Paszkiewicz et al., "Electrical Conductivity of Poly(ethylene terephthalate) Expanded Graphite Nanocomposites Prepared by in Situ Polymerization", Journal of Polymer Science Part B: Polymer Physics, vol. 50, No. 23, Sep. 28, 2012, pp. 1645-1652.

Shabafrooz Vahid et al: "Graphene dispersion in a surfactant-free, polar solvent", Journal of Material Science, Kluwer Academic Publishers, Dordrecht, vol. 53, No. 1 Sep. 20, 2017 (pp. 559-572).

Wikipedia, "Polythelyen terephthalate", Jun. 25, 2015, https:en.wikipedia.org/w/indx.php?titles=Polythylene_terephthalate&oldid=668611834, p. 5.

World Health Organization, "Cobalt and Cobalt Compounds", IARC Monographs on the Evaluation of Carcinogenic Risks to Humans, vol. 52, pp. 363-472, 1980s, http://monographs.iarc.fr/ENGMonographs/vol52/mom52-16.pdf.

Zhang et al., "Electrically Conductive Polyethylene Terephthalate/Graphene Nanocomposites Prepared by Melt Compounding", 2010, pp. 1191-1196, Publisher: Polymer 51, Published in: US.

* cited by examiner

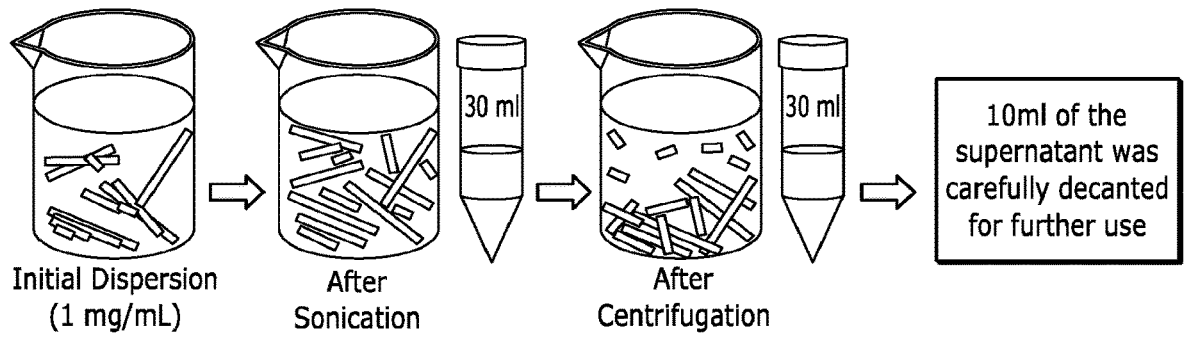
FIG. 6
| Sonication Time (hrs) | $C_G$ (mg/mL) | | | |
|---|---|---|---|---|
| | Centrifugal Speed (rpm) | | | |
| | 1500 | 2500 | 3500 | 4500 |
| 24 | 0.06 | 0.03 | 0.02 | 0.01 |
| 48 | 0.08 | 0.05 | 0.04 | 0.03 |
| 96 | 0.11 | 0.09 | 0.02 | 0.01 |
FIG. 7
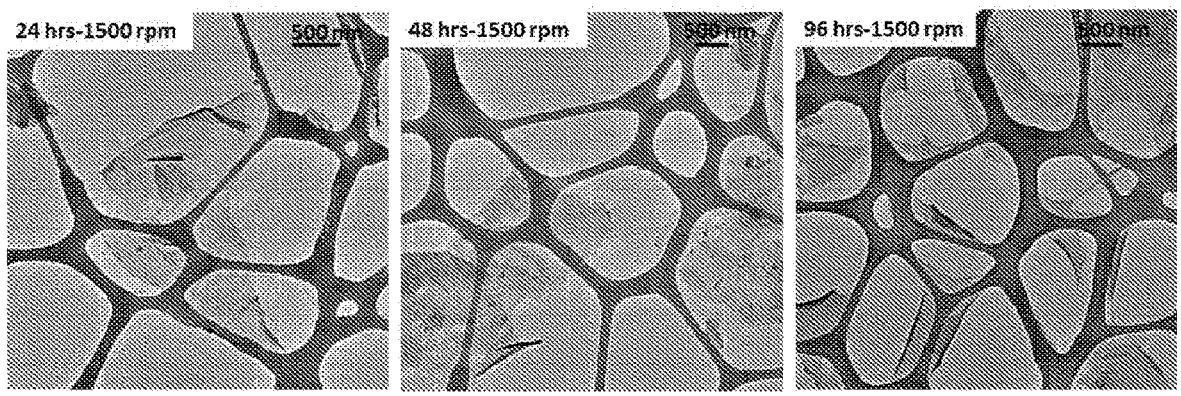
FIG. 8

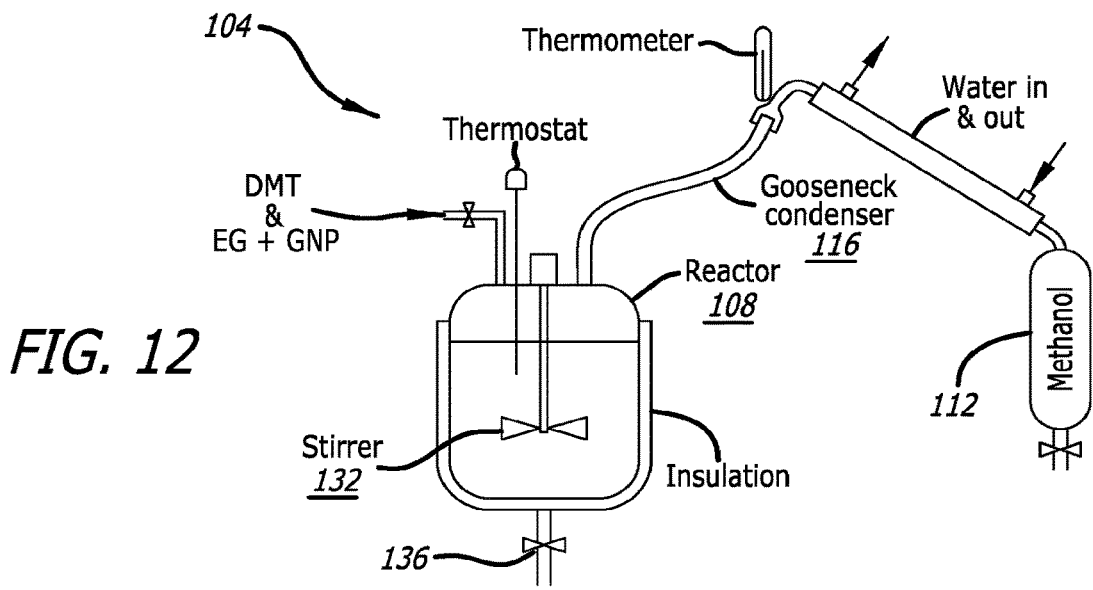
FIG. 12
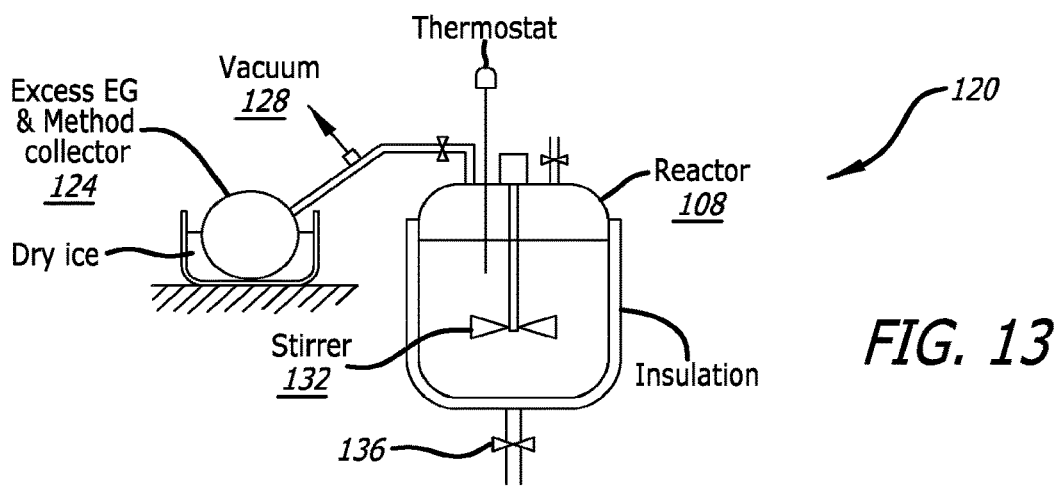
FIG. 13
FIG. 14
| Material | E.I. Duration (min) | Methanol Yield (ml) | P.C. Duration (min) | Polymer Yield (g) |
|---|---|---|---|---|
| PET | 180 | 310 | 135 | 160 |
| PET + 0.1% GNP (750 m$^2$/g) | 188 | 310 | 105 | 380 |
| PET + 0.1% GNP (120 m$^2$/g) | 192 | 324 | 112 | 190 |

GRAPHENE POLYETHYLENE TEREPHTHALATE COMPOSITE FOR IMPROVING REHEAT ENERGY CONSUMPTION

PRIORITY

This application is a divisional of, and claims priority to, U.S. patent application Ser. No. 16/837,626, filed Apr. 1, 2020, which claims the benefit of and priority to U.S. Provisional Application, entitled "Graphene Polyethylene Terephthalate Composite For Improving Reheat Energy Consumption," filed on Apr. 1, 2019 and having application Ser. No. 62/827,439, the entirety of said application being incorporated herein by reference.

FIELD

The field of the present disclosure generally relates to polymer composites. More particularly, the field of the invention relates to a graphene polyethylene terephthalate composition and a method for improving reheat energy consumption.

BACKGROUND

Composites are defined as multiphase materials, which may occur naturally or may be manufactured. Manufactured composites typically are a formulation of one or more materials selected so as to achieve properties that are not individually exhibited by the materials comprising the composite. Composites may be classified based on a type of continuous matrix and dispersed phases, such as a reinforcement. Composite materials comprising at least one constituent phase, primarily the dispersed phase, having at least one dimension on the order of 1-100 nanometers (nm) are referred to as "nanocomposites." Nanocomposites may be further classified based on category (e.g., organic or inorganic), as well as geometry of nanoscale reinforcement. A few well-known examples of naturally occurring nanocomposites include human bone, seashells, spider silk, and armored fish. As will be appreciated, each of these nanocomposite materials comprises a structural hierarchy (i.e., structure at multiple length scales) which makes them perform exceptionally well as compared with other materials of a similar chemistry.

Material properties of composites are known to be dependent on interactions between the matrix and the dispersed phases. Large surface areas per unit volume at the nanoscale generally cause nanomaterials to function differently than their bulk counterparts. With increased interactions between the matrix and the dispersed phase, nanocomposites are considered relatively superior to conventional composites, providing new advantageous properties without compromising existing beneficial properties, such as strength or durability.

Polyethylene terephthalate (PET) is an aromatic semi-crystalline thermoplastic polyester, first synthesized in the early 1940s. FIG. 1 is a chemical formula illustrating a molecular structure of PET. Polyethylene terephthalate is well known for its strength and toughness, high glass transition and melting points, chemical resistance, and optical properties. Polyethylene terephthalate is commonly used for commodity and engineering applications due to its relatively low cost. Polyethylene terephthalate is characterized by a microstructure wherein longitudinal stretching forms strong fibers with a high molecular chain orientation, as well as bi-axial stretching forming strong films. Linear PET is naturally semi-crystalline. Thermal and mechanical history, such as rate of cooling and stretching, can drive PET to be amorphous or more crystalline, and thus influence its mechanical properties. Although PET is utilized in industries such as fiber, packaging, filtration, and thermoforming, the widespread use of PET generally is constrained due to a slow crystallization rate and a limited barrier performance as compared with other commonly used polyesters.

It will be appreciated that there has been a long felt need for developing lightweight materials for use across a wide range of industries, such as packaging, automotive, and aerospace, and thus attempts have been made to improve material properties through better control of material processing and an addition of reinforcements. For example, increasing the crystallinity of PET improves its mechanical and barrier properties. Restrictions with the material, however, such as crystallization rate, and with industrial processes in maximizing crystallinity, such as cooling rate, cycle time, and stretching process, have limited attempts to improve the material properties of PET. Progress in the field of nanomaterials, however, has led to a development of PET nanocomposites which improve the physical properties of PET, thus making PET more effective for applications within the automotive, aerospace, and protective apparel industries. Different types of nanoreinforcements, such as clay, carbon nanofibers (CNF), carbon nanotubes (CNT), graphene, silicon dioxide ($SiO_2$), and the like, have been found to improve many properties of PET, such as mechanical, thermal, barrier, electrical, fire retardation, optical, surface properties, crystallization kinetics of PET, and the like.

As will be appreciated, exfoliation of nanoreinforcements into individual entities and their uniform dispersion into a polymer matrix is essential for the success of polymer nanocomposites. Uniform dispersion of nanoreinforcements in polymers may be achieved by way of various approaches, including, but not limited to, melt-compounding, in-situ polymerization, surface treatment of the nanoreinforcements, and the like. Carbon nanomaterials, such as carbon nanofibers, carbon spheres, carbon nanotubes, and graphene, illustrated in FIG. 2, generally are advantageous due to their superior material properties and simple chemistry. Multifold property improvements may be achieved through the dispersion of carbon nanomaterials into polymers Graphene is a relatively new nanomaterial which comprises a single layer of carbon atoms similar to an unzipped single walled carbon nanotube. Single layer graphene generally is twice as effective as carbon nanotubes in reinforcing polymers since graphene has two flat surfaces for polymer interaction whereas a carbon nanotube comprises only one exterior surface for polymer interaction. It will be appreciated that a development of graphene synthesis methods in conjunction with an introduction of new graphene-based nanomaterials, such as graphene oxide, expanded graphite, and graphene nanoplatelets, has made graphene commercially viable. However, application of graphene-based nanomaterials in fabricating polymer nanocomposites has been hindered due to limited information about the influence of graphene nanomaterials in reinforcing polymers.

Melt-compounding and in-situ polymerization have been the most studied techniques for preparing PET-graphene nanocomposites. Although in-situ polymerization is effective in dispersing graphene, the use of in-situ polymerization heretofore has been limited due to difficulties in attaining a desired molecular weight and a need for expensive reactors. Melt-compounding is a straight-forward approach involving shear mixing, but that alone has not been found to be effective in dispersing graphene in several tested polymer systems. As will be appreciated, achieving a homogenous dispersion of graphene nanoplatelets in PET is critical for improving bulk properties. Dispersing graphene in PET is nontrivial, however, as PET generally is highly viscous (500-1000 Pa s) with a melting temperature of 260° C.-280° C. Thus, selecting a process that facilitates working at high temperatures and with highly viscous materials is necessary.

Another important aspect for an implementation of polymer nanocomposite applications is an ability to predict resultant material properties so as to provide flexibility in designing manufacturing processes and reduce developmental costs. Traditional composite models are not accurate in predicting the properties of nanocomposites. Although micromechanical models based on continuum theory have been found to be effective in estimating short fiber composites, few studies have reported an applicability of these models to nanocomposites.

As such, there is a continuing desire to develop effective and reliable processes whereby graphene nanoplatelets may be uniformly dispersed in PET so as to provide reinforced bulk PET composites exhibiting improved thermal properties, such as a reduced reheat energy consumption.

SUMMARY

A composition and methods are provided for a graphene reinforced polyethylene terephthalate composition for forming graphene-PET containers. The graphene reinforced polyethylene terephthalate composition includes a continuous matrix comprising polyethylene terephthalate and a dispersed reinforcement phase comprising graphene nanoplatelets. The graphene nanoplatelets range in diameter between 5 μm and 10 μm with surface areas ranging from about 15 $m^2/g$ to about 150 $m^2/g$. In some embodiments, the graphene reinforced polyethylene terephthalate comprises a concentration of graphene nanoplatelets being substantially 3% weight fraction of the graphene reinforced polyethylene terephthalate. The graphene reinforced polyethylene terephthalate is configured to be injection molded into a graphene-PET preform suitable for forming a container. The graphene-PET preform is configured to be reheated above its glass transition temperature and blown into a mold so as to shape the graphene-PET preform into the container.

In an exemplary embodiment, a graphene reinforced polyethylene terephthalate composition comprises: a continuous matrix comprising polyethylene terephthalate; and a dispersed reinforcement phase comprising graphene nanoplatelets.

In another exemplary embodiment, the graphene nanoplatelets comprise a minimal number of layers of two-dimensional mono-atomic carbon sheets. In another exemplary embodiment, the number of layers ranges between substantially 1 layer and 7 layers. In another exemplary embodiment, the number of layers ranges between substantially 1 layer and 4 layers.

In another exemplary embodiment, the graphene reinforced polyethylene terephthalate is configured to be injection molded into a graphene-PET preform suitable for forming a container. In another exemplary embodiment, the graphene-PET preform is configured to be reheated above its glass transition temperature and blown into a mold so as to shape the graphene-PET preform into the container. In another exemplary embodiment, the polyethylene terephthalate comprises neat PET. In another exemplary embodiment, the polyethylene terephthalate comprises recycled PET.

In another exemplary embodiment, the graphene reinforced polyethylene terephthalate comprises a concentration of graphene nanoplatelets ranging between substantially 0.1% weight fraction and 15% weight fraction of the graphene reinforced polyethylene terephthalate. In another exemplary embodiment, the graphene reinforced polyethylene terephthalate comprises a concentration of graphene nanoplatelets being substantially 3% weight fraction of the graphene reinforced polyethylene terephthalate.

In another exemplary embodiment, the graphene nanoplatelets range in diameter between 5 μm and 10 μm with surface areas ranging from about 15 $m^2/g$ to about 150 $m^2/g$. In another exemplary embodiment, the graphene nanoplatelets include a diameter of about 10 μm with surface areas ranging between about 30 $m^2/g$ and about 60 $m^2/g$.

In an exemplary embodiment, a method for forming a reinforced polyethylene terephthalate products comprises: forming a PET resin; dispersing graphene nanoplatelets into the PET resin to form graphene reinforced PET resin; manipulating the graphene reinforced PET resin into pellets; reheating the pellets to form a molten liquid; and forming the molten liquid into desired products.

In another exemplary embodiment, forming the PET resin comprises combining ethylene glycol and terephthalic acid under high temperature and low vacuum pressure to form a neat PET resin suitable for manufacturing the desired products. In another exemplary embodiment, forming the PET resin comprises obtaining recycled PET to form a recycled PET resin suitable for manufacturing the desired products. In another exemplary embodiment, manipulating the graphene reinforced PET resin into pellets further comprises distributing the pellets to one or more manufacturers of the desired products.

BRIEF DESCRIPTION OF THE DRAWINGS

The drawings refer to embodiments of the present disclosure in which:

FIG. 6 is a schematic illustrating an exemplary sonication and centrifugation process for dispersing graphene nanoplatelets within a solvent, according to the present disclosure;

FIG. 7 is a table illustrating a relationship between a concentration of graphene nanoplatelet dispersion in ethylene glycol as function of sonication time and centrifugal speed, according to the present disclosure;

FIG. 8 comprises transmission electron micrograph images of graphene nanoplatelets dispersed in ethylene glycol after having been sonicated for a duration of 24 hours, 48 hours, and 96 hours, and then centrifuged at a rotational speed of substantially 1500 RPM;

FIG. 12 is a schematic illustrating a reactor for performing an ester interchange reaction, according to the present disclosure;

FIG. 13 is a schematic illustrating a reactor for performing a polycondensation reaction in accordance with the present disclosure; and FIG. 14 is a table listing reaction times and polymer yields for various polymerization batches, according to the present disclosure.

Figure 1:
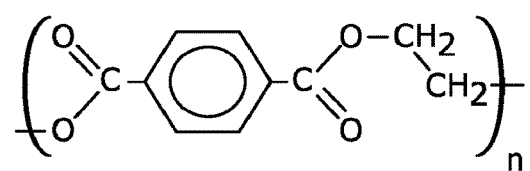
FIG. 1 is a chemical formula illustrating a molecular structure of polyethylene terephthalate in accordance with the present disclosure.
Figure 2:
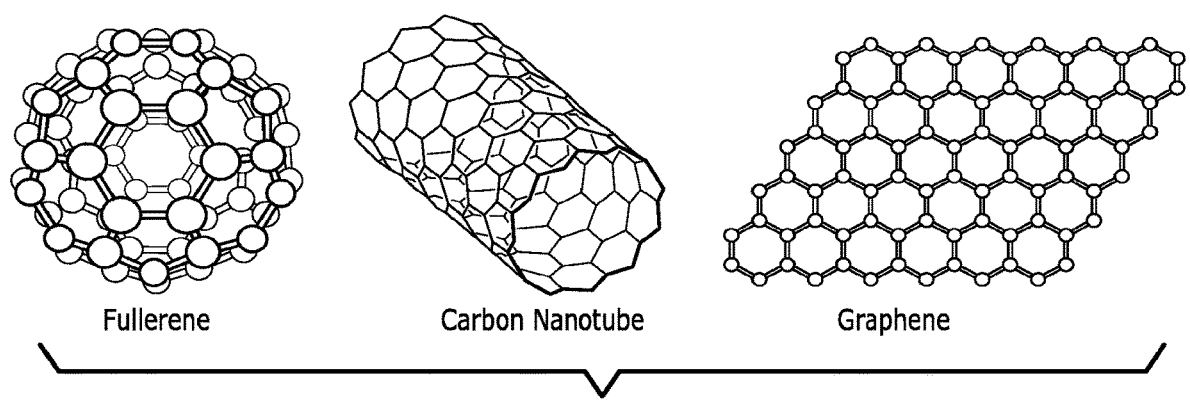
FIG. 2 illustrates unique structures of carbon allotropes in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first phase," may be made. However, the specific numeric reference should not be interpreted as a literal sequential order but rather interpreted that the "first phase" is different than a "second phase." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, polyethylene terephthalate (PET) is formed into containers by way of a two-step process. In the first step, a tube-shaped preform is injection molded. In the second step, the preform is reheated above its glass transition temperature and blown into a mold with high pressure air so as to shape the preform into a desired container, such as a bottle. Experimental observations have demonstrated that incorporating graphene into PET operates well as a fast reheat additive and exhibits a significant reduction in absorbance and energy consumption during reheating. In one embodiment, for example, a composition of PET and 0.0015% (15 ppm) of graphene resulted in about a 10% energy savings. Further, absorbance and energy savings during traditional fast reheat techniques is known to be a function of let-down ratio (LDR). In one embodiment, for example, including graphene in neat PET at an LDR of 0.1% was observed to provide more than 40% energy savings as compared with PET in absence of graphene.

It is contemplated that including graphene with recycled PET (rPET) results in energy savings similar to those observed with graphene in neat PET. As will be appreciated, however, rPET is more challenging due to potential color inconsistencies in rPET streams. For example, since rPET typically has a range of color and additives mixed due to unknown heat histories and sources ranging from CSD, Hot Fill, water, and other types of containers, manufacturing processes using rPET tend to exhibit changes in efficiency. Thus, manufacturing processes must be adjusted as scrap rates become high (e.g., over 3%) when the process recipe is no longer optimally matched to incoming material thermal properties. In some embodiments, the effects of color inconsistencies in rPET may be mitigated by any of improving cleaning, improving melt filtering, and finding a lower LDR where absorbance is low enough that rPET exhibits desired energy savings. In some embodiments, the fast reheat property of graphene may be used to mask the inconsistent absorbance properties of rPET so that scrap is reduced. Further, since the interaction of graphene is so strong for blow molding, using graphene potentially may obviate adjusting the manufacturing process due to changes in incoming material. It is contemplated that graphene may be incorporated into the rPET at a manufacturing site during injection as a processing aid and to reduce both energy and scrap, thereby increasing efficiency for the manufacturer.

As will be appreciated, the basic building blocks of PET are ethylene glycol and terephthalic acid, which may be combined by a PET resin supplier to form resin pellets of PET. The resin pellets may then be shipped to a container manufacturer to be heated to a molten liquid that can be easily extruded or molded into items of practically any desired shape, such as containers or bottles. As such, it is contemplated that, in some embodiments, the PET resin supplier may advantageously incorporate graphene into neat PET and/or rPET in a reactor to form resin pellets comprising graphene-reinforced PET. The graphene-reinforced PET may then be shipped to one or more container manufacturers to be shaped into desired containers or bottles.

Figure 3:
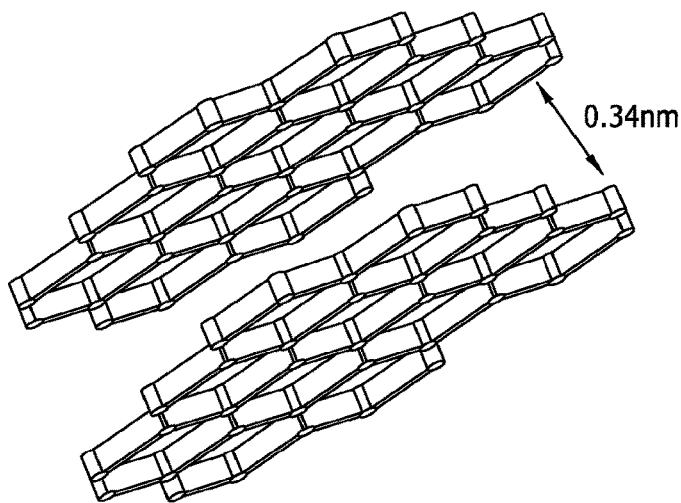
FIG. 3 illustrates a molecular structure of graphene comprising a two-dimensional mono-atomic thick carbon allotrope, having a hexagonal structure in accordance with the present disclosure.

FIG. 3 illustrates a molecular structure of graphene comprising a two-dimensional mono-atomic thick carbon allotrope, having a planar $sp^2$ hybridization structure with a C—C bond distance of 0.142 nm. A thickness of a single graphene sheet is estimated to be substantially 0.335 nm. The density of single layer graphene has been calculated to be 0.77 mg m$^{-2}$. Possessing a Young's modulus of 1.02±0.03 TPa and a strength of 130±10 GPa, it will be appreciated that graphene is regarded as the strongest material with appreciable size. Further, graphene exhibits a negative coefficient of thermal expansion, $\alpha = -4.8 \pm 1.0 \times 10^{-6}$ K$^{-1}$ through a temperature range of 0-300 K, and a very high thermal conductivity of 3000 W mK$^{-1}$. Graphene sheets have been found to be hydrophobic and have a surface energy at room temperature of 46.7 mJ m$^{-2}$.

Figure 4:
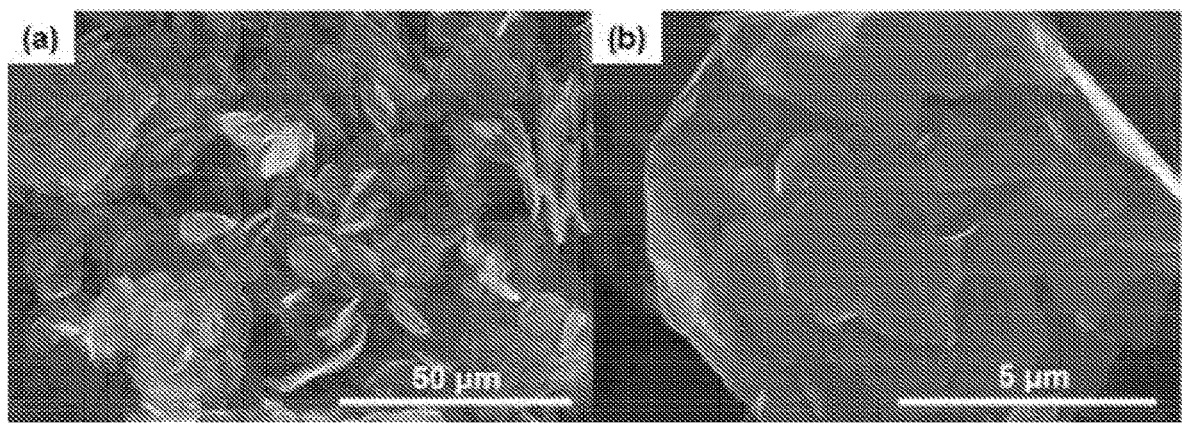
FIG. 4 comprises micrograph images of graphene nanoplatelets, according to the present disclosure.

In some embodiments, graphene in the form of graphene nanoplatelets (GNPs) may be obtained by way of any of various commercial suppliers. Commercially available graphene nanoplatelets generally comprise two different average surface areas. In some embodiments, graphene nanoplatelets with an average diameter of 5 micrometers (μm), a thickness ranging between 6 nm and 8 nm, and an average surface area of 120-150 $m^2/g$, may be used to prepare nanocomposites. In some embodiments, graphene nanoplatelets with an average diameter of 2 μm, and an average surface area of 750 $m^2/g$ may be used for in-situ polymerization. In some embodiments, the graphene nanoplatelets may range in diameter between 5 μm and 10 μm with surface areas ranging from about 15 $m^2/g$ to about 150 $m^2/g$. Further, in some embodiments, the graphene nanoplatelets may be about 10 μm in diameter with surface areas ranging between about 30 $m^2/g$ and about 60 $m^2/g$. Moreover, in some embodiments, the graphene nanoplatelets may be obtained in an initially dry agglomerated powder form, wherein each agglomerated platelet comprises several nanoplatelets, as shown in FIG. 4. As will be appreciated, the nanoplatelets generally are not uniform and comprise uneven edges.

As discussed herein, in-situ polymerization may be employed in the preparation of polymer nanocomposites, such as graphene reinforced PET. As will be appreciated, in-situ polymerization generally includes two steps. A first step comprises intercalating nanoscale reinforcements in a solution phase by way of compatible polymer precursors or solvents. In a second step, polymerization is undertaken using the nanoplatelet intercalated solution. As will be appreciated, dispersing the nanoplatelets into a chemically compatible and low viscosity material is more efficient than directly mixing nanoplatelets with a highly viscous polymer melt. As such, it will be appreciated that since ethylene glycol (EG) is a raw material used for polymerization of PET, ethylene glycol may be advantageously used as a solvent for dispersing graphene nanoplatelets. It should be understood, however, that the polymerization of PET disclosed herein is not to be limited to using ethylene glycol as a solvent for dispersing graphene nanoplatelets, but rather other suitable solvents may be used for dispersing graphene nanoplatelets, without limitation, such as polyethylene glycol (PEG), mineral oil, carrier systems used for PET liquid colorant and additives, isopropanol (IPA), N-Methyl-2-pyrrolidinone (NMP), and the like.

Figure 5:
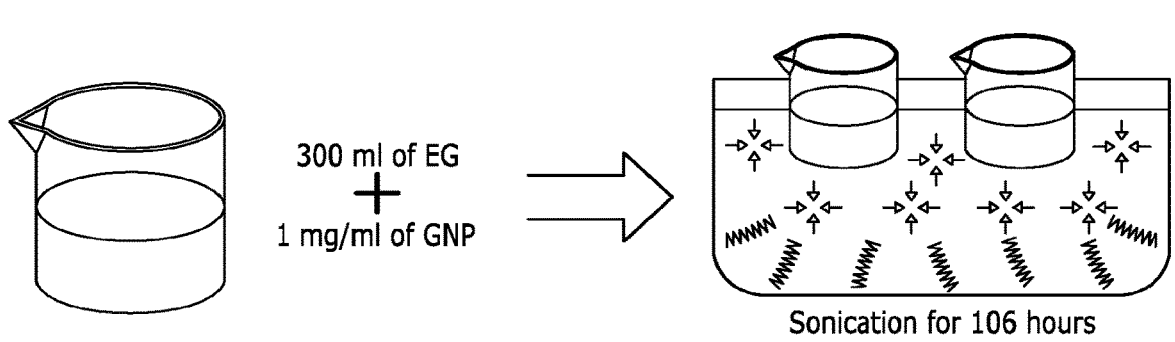
FIG. 5 is a schematic illustrating an exemplary sonication process for dispersing graphene nanoplatelets within ethylene glycol in accordance with the present disclosure.

FIG. 5 is a schematic illustrating an exemplary sonication process for dispersing graphene nanoplatelets within ethylene glycol in accordance with the present disclosure. As indicated in FIG. 5, in some embodiments, graphene nanoplatelets may be added to reagent grade ethylene glycol at a concentration of 1 mg/ml (i.e., 0.1% weight fraction), placed into suitably sized solution beakers, and then sonicated for a specific period of time using a bath sonicator at a predetermined frequency. In one embodiment, the bath sonicator operates at a frequency of 40 kHz for a period of 106 hours so as to ensure a homogenous dispersion of graphene nanoplatelets within the ethylene glycol. In some embodiments, the frequency may be ultrasonic, and the time period may be at least 24 hours, 48 hours, 96 hours, or any period of time deemed appropriate to homogenously disperse the graphene nanoplatelets within the ethylene glycol. During the sonication process, illustrated in FIG. 5, the solution beakers were covered with aluminum foil so as to prevent exposure to atmospheric oxygen.

Moreover, in some embodiments, dispersions may be prepared by way of either low or high surface area graphene nanoplatelets. For example, in some embodiments, the graphene nanoplatelets range in diameter between 5 μm and 10 μm with surface areas ranging from about 15 $m^2/g$ to about 150 $m^2/g$. In some embodiments, the graphene nanoplatelets are about 10 μm in diameter with surface areas ranging from about 30 $m^2/g$ to about 60 $m^2/g$. It should be further understood that the concentration of graphene nanoplatelets is not limited to 0.1% weight fraction, as described hereinabove, but rather other concentrations may be formed, such as, by way of non-limiting example, any concentration up to 2%, 5%, 10% and 15% weight fraction. Preferably, however, the concentration of graphene nanoplatelets is substantially 3% weight fraction of the PET-graphene nanocomposite.

As will be appreciated, regardless of the length of time during which sonication is maintained, only a portion of the graphene nanoplatelets in solution will be suitably dispersed within the ethylene glycol. Thus, a centrifuge may be utilized to remove the portion of larger graphene nanoplatelets that are not suitably dispersed within the ethylene glycol. FIG. 6 is a schematic illustrating an exemplary process comprising sonication and centrifugation whereby larger graphene nanoplatelets are removed, thus leaving a supernatant solution of ethylene glycol with dispersed graphene nanoplatelets. After centrifugation, the supernatant solution of ethylene glycol and dispersed graphene nanoplatelets may be decanted for use in polymerization of PET, as described herein.

It should be understood that centrifugation may be performed at any rotational speed deemed suitable, and for any period of time as needed. In some embodiments, centrifugation may be performed at a rotational speed of at least 1500 revolutions per minute (RPM). In some embodiments, the rotational speed of centrifugation may be at least 2500 RPM. In some embodiments, the rotational speed of centrifugation may be at least 3500 RPM. Further, in some embodiments, centrifugation may be performed at a rotational speed of at least 4500 RPM. Those skilled in the art will recognize that the concentration of remaining material in the supernatant may be evaluated by measuring an optical absorbance of the graphene and then correlating the optical absorbance (A) to the concentration of graphene after centrifugation ($C_G$) by way of Beer-Lambert's law $A=\alpha C_G l$. FIG. 7 is a table illustrating a relationship between the concentration of graphene nanoplatelet dispersions in ethylene glycol as a function of sonication time and centrifugal speed, as described herein. FIG. 7 indicates that in some embodiments, sonication and centrifugation disperses graphene nanoplatelets in ethylene glycol at concentrations of up to 0.11 mg/mL.

In some embodiments, transmission electron microscopy (TEM) may be used to determine a degree of exfoliation of graphene nanoplatelets within the ethylene glycol. As will be appreciated, a difference in electron densities between ethylene glycol and the graphene nanoplatelets provides a visible contrast in transmission electron micrographs. The graphene nanoplatelets appear as dark regions due to their relatively higher density as compared to the density of ethylene glycol. Thus, TEM is capable of providing two-dimensional information about the exfoliated graphene nanoplatelets, such as thickness, length, and diameter of the nanoplatelets. FIG. 8 comprises three micrographs illustrating TEM images for graphene dispersion samples that were sonicated for a duration of 24 hours, 48 hours, and 96 hours, and then centrifuged at a rotational speed of substantially 1500 RPM.

Figure 9A:
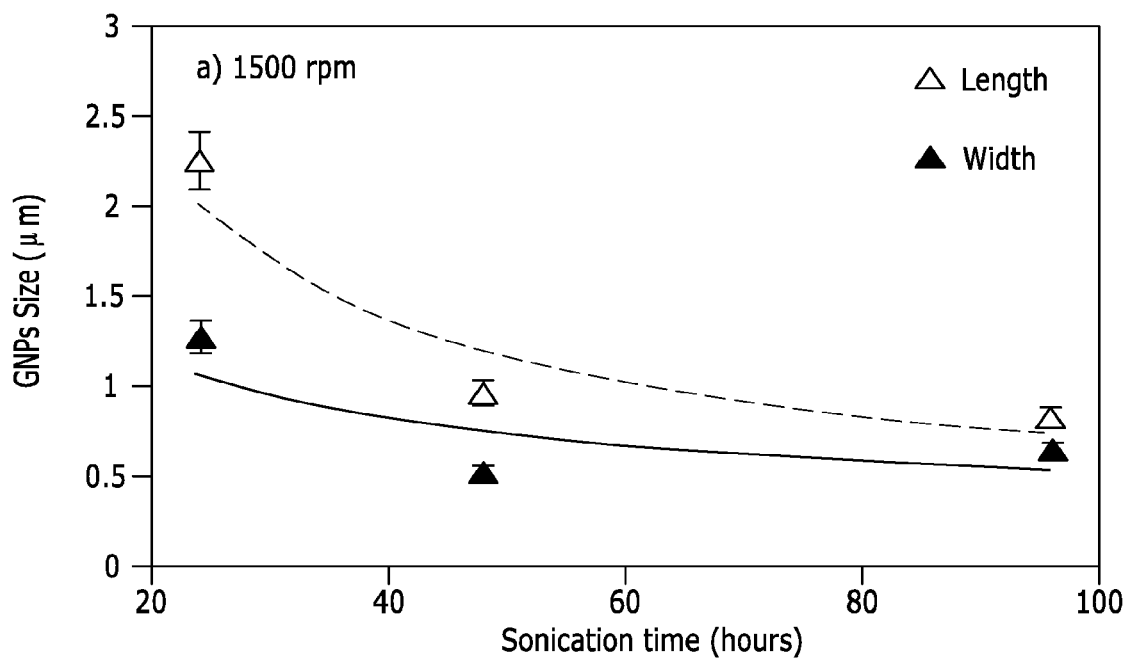
FIG. 9A is a graph illustrating an average length and width of graphene nanoplatelets dispersed in ethylene glycol as a function of sonication time and a centrifugation speed of substantially 1500 RPM.
Figure 9B:
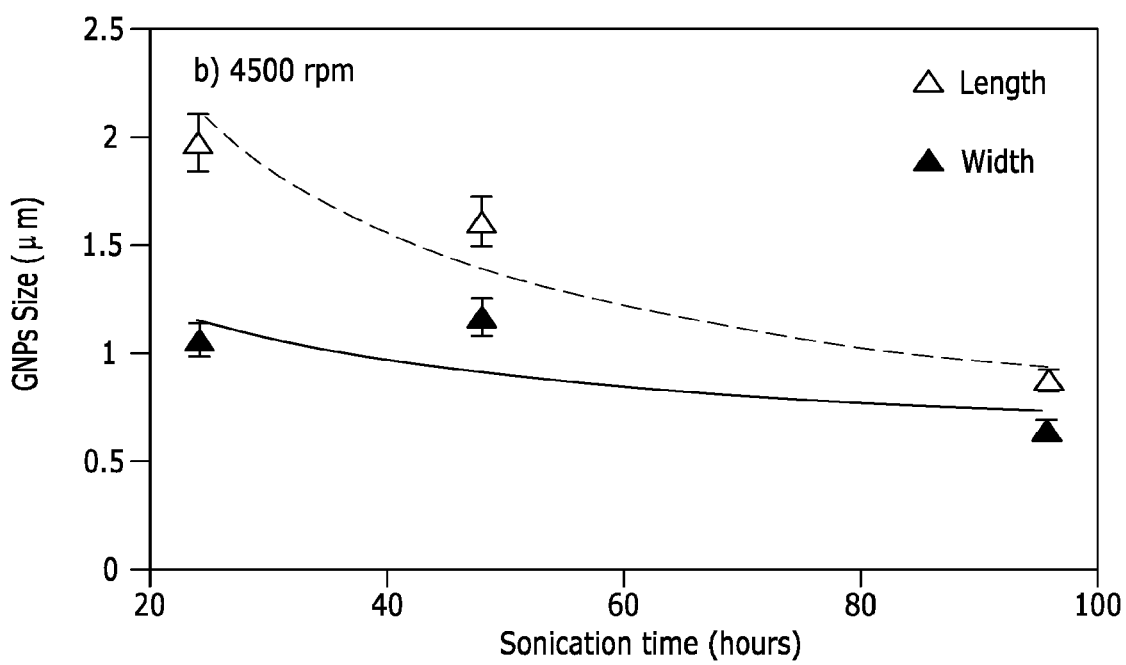
FIG. 9B is a graph illustrating an average length and width of graphene nanoplatelets dispersed in ethylene glycol as a function of sonication time and a centrifugation speed of substantially 4500 RPM.

As will be appreciated, transmission electron micrographs such as those illustrated in FIG. 8 facilitate developing a relationship between a sheet size of the dispersed graphene nanoplatelets and the duration of sonication. FIG. 9A is a graph illustrating an average length and width of the dispersed graphene nanoplatelets as a function of sonication time and a centrifugation speed of 1500 RPM. FIG. 9B is a graph which is substantially similar to the graph illustrated in FIG. 9A, with the exception that the graphene dispersion samples represented in the graph illustrated in FIG. 9B were centrifuged with a rotational speed of substantially 4500 RPM. FIGS. 9A and 9B indicate that increasing the duration of sonication is associated with a reduction in the average length and width of the nanoplatelets.

While the transmission electron micrographs shown in FIG. 8 provide information about the average length and width of the dispersed graphene nanoplatelets, information about the thickness (i.e., a number of layers) of the nanoplatelets is required to better determine the degree of exfoliation of graphene nanoplatelets within the ethylene glycol. It will be appreciated that Raman spectroscopy is a widely used technique for characterizing graphene. A characteristic Raman spectrum of single layer graphene is known to have a peak near 1580 cm$^{-1}$ (G-band) corresponding to C—C stretching of sp$^2$ carbon materials. Another peak near 2680 cm$^{-1}$ (G'-band) is a corresponding higher order mode. In some cases, a presence of defects in graphene are known to give rise to a Raman peak near 1350 cm$^{-1}$ (D-band), which is useful in analyzing the quality of graphene. In the case of multi-layer graphene, the intensity of the G-band (~1580 cm$^{-1}$) may be used to identify graphene nanoplatelets comprising a thickness ranging between 1 layer and 7 layers. Further, in some embodiments a shape of the G'-band (~2680 cm$^{-1}$), or a 2D-band, may be used to identify graphene nanoplatelets comprising a thickness ranging between 1 layer and substantially 4 layers.

Figure 10:
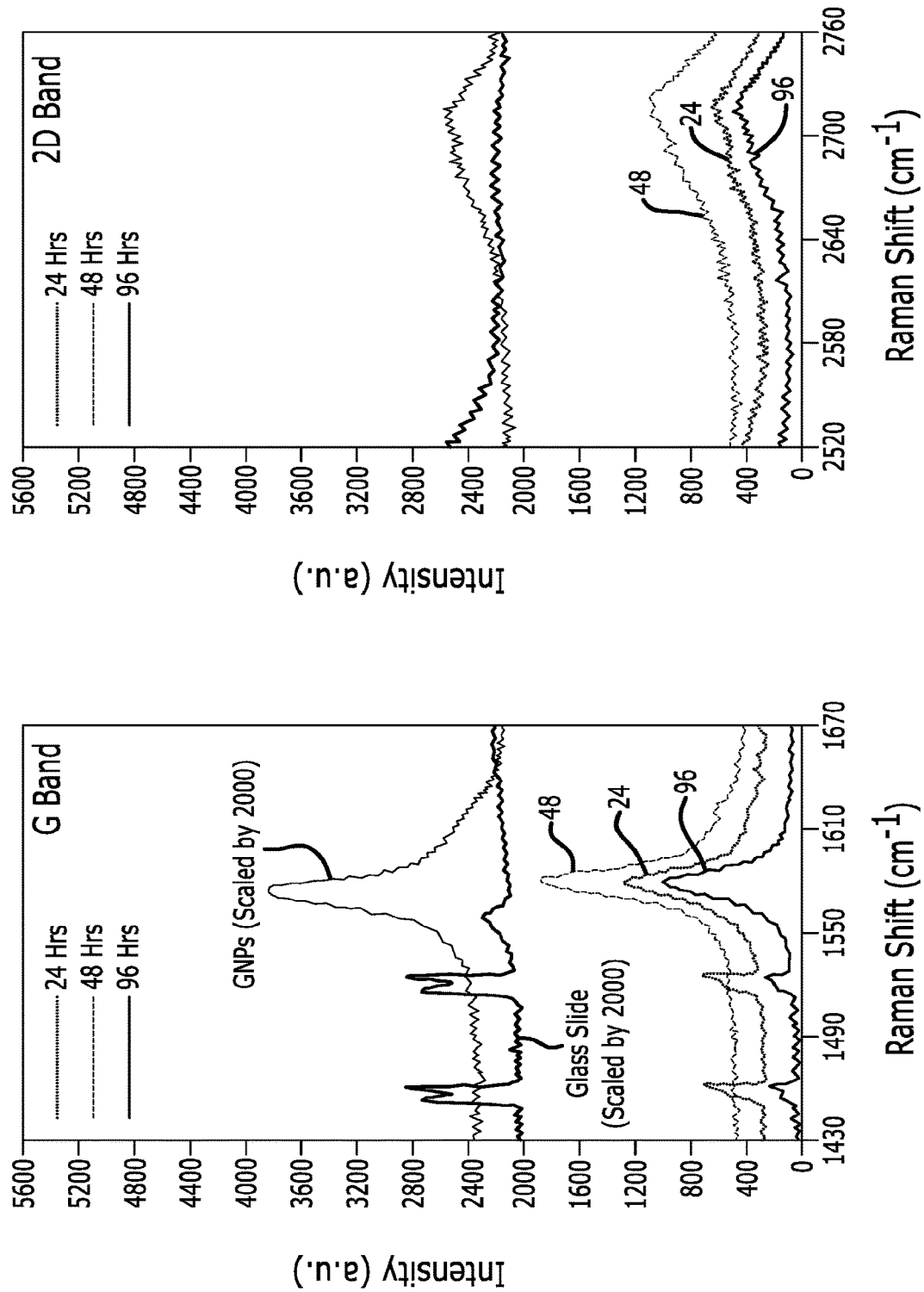
FIG. 10 comprises a Raman analysis of graphene nanoplatelets dispersed in ethylene glycol that were sonicated for a duration of 24 hours, 48 hours, and 96 hours, and then centrifuged at a rotational speed of substantially 1500 RPM.

FIG. 10 comprises a Raman analysis of the graphene dispersion samples that were subjected to TEM imaging in FIG. 8. As will be appreciated, a ratio of $I_{2D}/I_G$ represents the number of layers comprising the dispersed graphene nanoplatelets. Upon coupling the Raman analysis of FIG. 10 with the TEM data shown in FIG. 8 and plotted in FIGS. 9A and 9B, it becomes apparent that increasing the duration of sonication better separates the dispersed graphene nanoplatelets into individual layers, but sonication also operates to decrease the average sheet size of the nanoplatelets.

Once the graphene nanoplatelets are suitably dispersed within the ethylene glycol, the solution may be used for in-situ polymerization of graphene reinforced polyethylene terephthalate. In some embodiments, in-situ polymerization of graphene nanoplatelets dispersed in ethylene glycol and dimethyl terephthalate may be performed by way of a two-step reaction. A first step is an ester interchange reaction (EI), illustrated in FIG. 11A, wherein a PET monomer and excess methanol are formed. In a second step, illustrated in FIG. 11B, a PET polymer chain and excess ethylene e glycol are formed by way of a polycondensation reaction (PC).

Figure 11A:
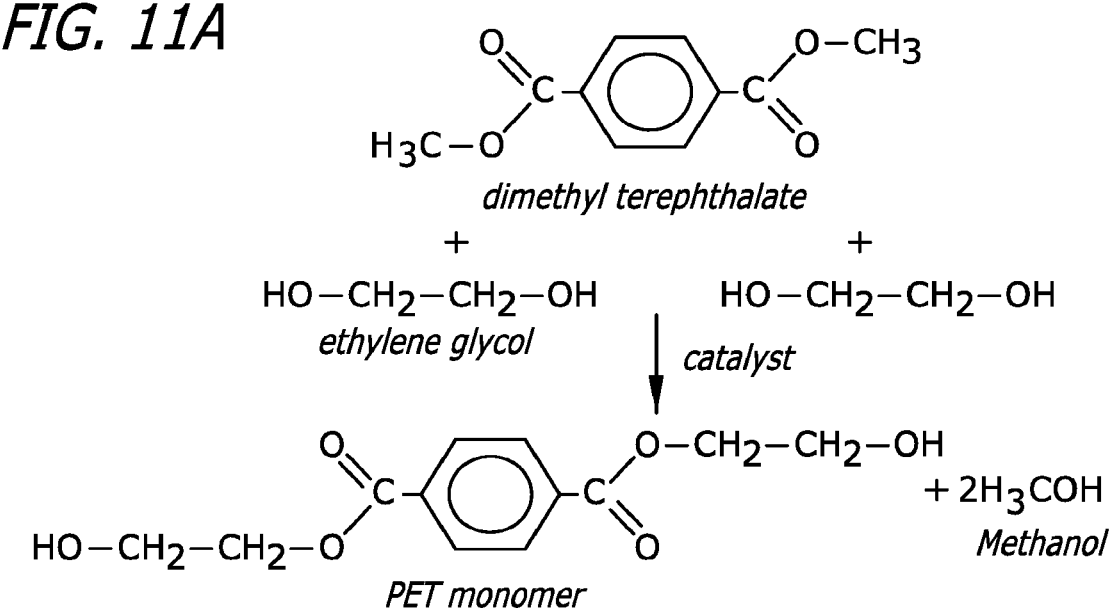
FIG. 11A is a chemical formula illustrating an ester interchange reaction between dimethyl terephthalate (DMT) and ethylene glycol (EG) to form a PET monomer and excess methanol in accordance with the present disclosure.

FIG. 12 is a schematic illustrating an exemplary embodiment of a reactor 104 for performing the ester interchange reaction illustrated in FIG. 11A. The reactor 104 generally comprises an insulated reaction chamber 108, a methanol collector 112, and a gooseneck condenser 116. In the embodiment illustrated in FIG. 12, powdered dimethyl terephthalate (DMT) is used for the polymerization. Ethylene glycol with dispersed graphene nanoplatelets and the powdered DMT are charged into the reaction chamber 108 under nitrogen purge at a 2.3:1 molar ratio, with an excess of ethylene glycol. Catalysts for the ester interchange reaction, manganese acetate ($Mn(CH_3COO)_2$), and for the polycondensation reaction, antimony trioxide ($Sb_2O_3$), are also added to the batch at 82 parts-per-million (ppm) and 300 ppm, respectively, and then the batch is heated to a batch temperature of substantially 175° C. under constant stirring.

Methanol collection begins when the batch approaches a temperature of about 170° C., indicating that the ester interchange reaction has started. Thus, when methanol collection begins, the nitrogen purge may be closed. In some embodiments, the batch temperature may be increased in steps, such as steps of 15° C. until the batch temperature reaches substantially 235° C. While the ester interchange reaction progresses, a temperature within the gooseneck condenser 116 will increase from room temperature to above 60° C. Once the gooseneck condenser temperature drops below 60° C., and the methanol collector 112 reaches a theoretical yield of 300 ml, the ester interchange reaction may be considered substantially finished. In some embodiments, the gooseneck condenser 116 may be removed and polyphosphoric acid ($H_3PO_4$) added to the batch at 38 ppm so as to terminate the ester interchange reaction. Those skilled in the art will appreciate that the entire ester interchange reaction may be performed by way of the rector 104 within a time period of substantially 3-4 hours.

Figure 11B:
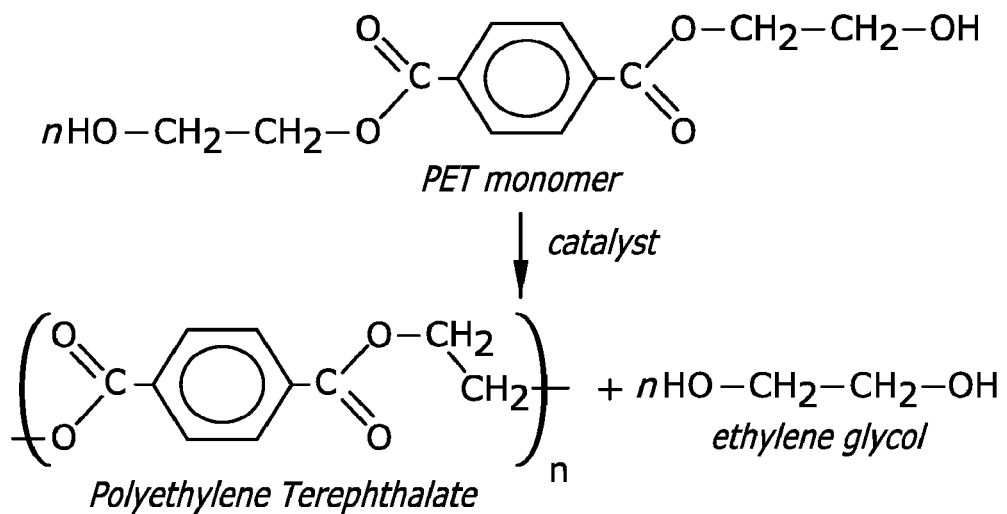
FIG. 11B is a chemical formula illustrating formation of a PET polymer chain and excess ethylene glycol by way of the PET monomer of FIG. 11A, in accordance with the present disclosure.

FIG. 13 is a schematic illustrating an exemplary embodiment of a reactor 120 for performing the polycondensation reaction illustrated in FIG. 11B. In the embodiment illustrated in FIG. 13, the reactor 120 comprises a reaction chamber 108, an excess EG collection condenser 124 and a vacuum pump 128. During the polycondensation reaction, a temperature within the reaction chamber 108 may be increased to substantially 285° C. and maintained under vacuum (~30 mm Hg) until PET of a desired viscosity is obtained. In some embodiments, isophthalic acid ($C_6H_4(COH)_2$) and stabilized cobalt may be added at 20 grams and 65 ppm, respectively, to the batch at the beginning of the polycondensation reaction. It will be appreciated that isophthalic acid limits the crystallinity of PET, thus making the PET easier to process. The stabilized cobalt operates so as to control a final color of the PET.

As the polycondensation reaction progresses, the molecular weight of PET increases within the reaction chamber 108 and ethylene glycol is released into the EG collection condenser 124. In some embodiments, the EG collection condenser 124 may comprise a round flask surrounded with dry ice so as to solidify the collected ethylene glycol, and thereby prevent the ethylene glycol from flowing into the vacuum pump 128.

It will be appreciated that as an increasing amount of PET is produced, the viscosity of the batch within the reaction chamber 108 will correspondingly change. As the quantity of PET increases, the viscosity of the batch increases and thus requires an increasing amount of mechanical power to stir the batch. Accordingly, the increasing PET will affect an electric current required to power a stirrer 132 within the chamber. Thus, monitoring the electric current passed to the stirrer 132 provides an indication of the progress of the polycondensation reaction. In one exemplary embodiment, the electric current passed to the stirrer 132 is monitored for change at 15-minute intervals. Once no change in the electric current is detected at two consecutive readings, the polycondensation reaction may be considered substantially finished. The vacuum pump 128 may then be stopped and the resultant polymer melt may be extruded from an opening 136 at the bottom of the reactor 120. In some embodiments, the polymer melt may be extruded from the opening 136 into an ice water bath and pelletized using a strand chopper. FIG. 14 illustrates reaction times and yields for exemplary batch polymerizations performed by way of the reactors 104, 120 respectively illustrated in FIGS. 12 and 13. Further, one of the exemplary batch polymerizations comprises an absence of graphene nanoplatelets and thus serves as a control batch polymerization.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A method for forming a reinforced polyethylene terephthalate product, the method comprising:
   forming a PET resin;
   dispersing graphene nanoplatelets at 0.0015 weight percent (wt %) to 0.1 wt % into the PET resin to form graphene reinforced PET resin;
   manipulating the graphene reinforced PET resin into pellets;
   heating the pellets to form a molten liquid;
   forming the molten liquid into a product; and
   reheating the product into a final shape through blow molding, thereby generating the reinforced polyethylene terephthalate product.

2. The method of claim 1, wherein forming the PET resin comprises combining ethylene glycol and terephthalic acid under high temperature and low vacuum pressure to form a neat PET resin suitable for manufacturing the product.

3. The method of claim 1, wherein forming the PET resin comprises obtaining recycled PET to form a recycled PET resin suitable for manufacturing the product.

4. The method of claim 1, wherein manipulating the graphene reinforced PET resin into pellets further comprises distributing the pellets to one or more manufacturers of the product.

* * * * *